United States Patent
Lewis et al.

(10) Patent No.: US 7,797,500 B1
(45) Date of Patent: Sep. 14, 2010

(54) GEOMETRY ADAPTATION USING DATA REDISTRIBUTION

(75) Inventors: Jeffrey A. Lewis, Ashland, MA (US); Anestis Panidis, Marlborough, MA (US); Arieh Don, Newton, MA (US); Pei-Ching Hwang, Shrewsbury, MA (US); Michael E. Specht, Acton, MA (US); Andrew Ralich, Natick, MA (US)

(73) Assignee: EMC Corporation, Hopkinton, MA (US)

( * ) Notice: Subject to any disclaimer, the term of this patent is extended or adjusted under 35 U.S.C. 154(b) by 461 days.

(21) Appl. No.: 11/726,311

(22) Filed: Mar. 21, 2007

(51) Int. Cl.
*G06F 13/00* (2006.01)
(52) U.S. Cl. ...................................... 711/162
(58) Field of Classification Search ........... None
See application file for complete search history.

(56) References Cited

U.S. PATENT DOCUMENTS

| | | | |
|---|---|---|---|
| 5,206,939 A | 4/1993 | Yanai et al. | |
| 5,604,906 A * | 2/1997 | Murphy et al. | 717/162 |
| 5,778,394 A | 7/1998 | Galtzur et al. | |
| 5,845,147 A | 12/1998 | Vishlitzky et al. | |
| 5,857,208 A | 1/1999 | Ofek et al. | |
| 6,253,300 B1 * | 6/2001 | Lawrence et al. | 711/173 |
| 6,697,813 B1 * | 2/2004 | Backman | 707/101 |
| 7,290,086 B2 * | 10/2007 | Beardsley et al. | 711/114 |
| 2003/0191911 A1 * | 10/2003 | Kleinschnitz et al. | 711/154 |

OTHER PUBLICATIONS

U.S. Appl. No. 10/880,279, Scharland, et al.
U.S. Appl. No. 10/879,383, Halligan, et al.
U.S. Appl. No. 11/478,946, Venkatanarayanan, et al.

* cited by examiner

*Primary Examiner*—Tuan V Thai
*Assistant Examiner*—Duc T Doan
(74) *Attorney, Agent, or Firm*—Muirhead and Saturnelli, LLC

(57) ABSTRACT

Described are techniques for migrating data from a source device to a target device. A source device descriptor of the source device including source device geometry parameters and a source device partition definition structure is received. Target device geometry parameters are received. The source partition definition structure is translated and a mapped partition definition structure in accordance with the target device geometry parameters is generated. A target device descriptor including the target device geometry parameters and the mapped partition definition structure is generated. The target device descriptor is stored on the target device. Data for one or more partitions of the source device is migrated to the target device.

20 Claims, 16 Drawing Sheets

GEOMETRY ADAPTATION USING DATA REDISTRIBUTION

BACKGROUND

1. Technical Field

This application generally relates to data storage, and more particularly to techniques used in connection with environments having different device geometries.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. Such storage devices are provided, for example, by EMC Corporation of Hopkinton, Mass. and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek. The host systems access the storage device through a plurality of channels provided therewith. Host systems provide data and access control information through the channels to the storage device and storage device provides data to the host systems also through the channels. The host systems do not address the disk drives of the storage device directly, but rather, access what appears to the host systems as a plurality of logical disk units. The logical disk units; also referred to as logical devices or logical volumes, may or may not correspond to the actual disk drives. Allowing multiple host systems to access the single storage device unit allows the host systems to share data stored therein.

A device, such as a logical device described above, has a size or capacity that may be expressed in terms of device geometry. The device geometry may be obtained using SCSI commands such as the mode sense page 3 and page 4 commands and the read capacity command. The device geometry may include device geometry parameters regarding the number of cylinders in the device, the number of heads or tracks per cylinder, and the number of blocks per track. The device capacity expressed in blocks may be represented as a mathematical product of the foregoing parameters. Each of the logical devices may be further divided into one or more partitions. Each logical device partition may be defined in a partition definition structure in terms of values affected by the device geometry parameters. For example, a partition may be defined as having a start cylinder and an end cylinder. The device geometry of the data storage system upon which the device is configured and the partition definition structure may be stored in a logical device descriptor or label.

Data from a first device in a first data storage system having a first geometry may be copied to a second device in a second data storage system having a second geometry different than the first geometry. Stored in the second device's descriptor is information indicating geometry parameters of the first data storage system. A problem may arise when performing an operation to add, delete, or modify an existing partition on the second device resulting in a modification to the partition definition structure of the device descriptor on the second device. When performing such an operation to update the partition information, a discrepancy exists between the device geometry parameters as stored in the second device's descriptor (e.g., reflecting those in accordance with the first data storage system) and the device geometry parameters of the second device as reported by the second data storage system. Existing techniques detecting the foregoing discrepancy may presume that there has been data corruption to the second device's descriptor resulting in subsequent processing that may be undesirable, such as ignoring the data included in the second device's descriptor and/or reinitializing the second device's descriptor.

SUMMARY OF THE INVENTION

In accordance with one aspect of the invention is a method for migrating data from a source device to a target device comprising: receiving a source device descriptor of the source device, the source device descriptor including source device geometry parameters and a source device partition definition structure; receiving target device geometry parameters; translating the source partition definition structure and generating a mapped partition definition structure in accordance with the target device geometry parameters; generating a target device descriptor including the target device geometry parameters and the mapped partition definition structure; storing the target device descriptor on the target device; and migrating data for one or more partitions of the source device to the target device. A host may be connected to a target data storage system including the target device and the host may be indirectly connected to a source data storage system including the source device. The may issue a command to the target data storage system instructing the target data storage system to obtain the source device descriptor from the source data storage system, and the method may further include returning the source device descriptor to the host. The host may issue a command to the target data storage system to obtain the target device geometry parameters. The host may performs said translating and said generating. The host may issue a command to the target data storage system to perform said migrating. Thee target data storage system may use a data pull technique to control copying data from the source device to the target device. The host may issue a command to the target data storage system instructing the target data storage system to invoke code on the target data storage system to perform said receiving a source device descriptor of the source device, said receiving target device geometry parameters, said translating, said generating, and said storing, and said migrating. The method may also include performing one or more data validation checks. The one or more data validation checks may include include determining whether data of the source device fits on said target device. The method may also include comparing a capacity of the source device to a capacity of the target device. The method may also include comparing a first sum of partition sizes of said source device to a second sum of partition sizes of said target device. The one or more validation checks may include detecting invalid overlapping partitions. A partition which completely contains one or more other partitions may be determined to be a valid overlapping partition. The steps of generating, storing and migrating may not be performed if said data validation processing is not successful. At least one of the source device geometry parameters may differ from at least one of the target device geometry parameters. The source device geometry parameters and the target device geometry parameters may each include a first value indicating a number of blocks/track, a second value indicating a number of tracks/cylinder and a third value indicating a number of cylinders in a logical device, said first, second and third values being determined in accordance with a data storage system including said each device.

In accordance with another aspect of the invention is a system comprising: a host; a source data storage system including a source device; a target data storage including a target device, the target data storage system being directly connected to the host and directly connected to the source data storage system, wherein said host only has indirect connectivity to the source data storage system through the target data storage system; and wherein the target data storage system includes code stored in a computer readable medium thereon for: obtaining a source device descriptor of the source device, the source device descriptor including source device geometry parameters and a source device partition definition structure; migrating data for one or more partitions of the source device to the target device using a data pull technique; and wherein the host includes code stored in a computer readable medium thereon for: obtaining target device geometry parameters from the target data storage system; issuing a command to the target data storage system to obtain the source device descriptor from the source data storage system; translating the source partition definition structure and generating a mapped partition definition structure in accordance with the target device geometry parameters; generating a target device descriptor including the target device geometry parameters and the mapped partition definition structure; issuing a command to the target data storage system to store the target device descriptor on the target device; and issuing a command to the target data storage system to migrate data for one or more partitions of the source device to the target device.

In accordance with another aspect of the invention is a computer readable medium comprising code stored thereon for migrating data from a source device to a target device, the computer readable medium comprising code for: receiving a source device descriptor of the source device, the source device descriptor including source device geometry parameters and a source device partition definition structure; receiving target device geometry parameters; translating the source partition definition structure and generating a mapped partition definition structure in accordance with the target device geometry parameters; generating a target device descriptor including the target device geometry parameters and the mapped partition definition structure; storing the target device descriptor on the target device; and migrating data for one or more partitions of the source device to the target device. The computer readable medium may further comprising code for: performing one or more data validation checks.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
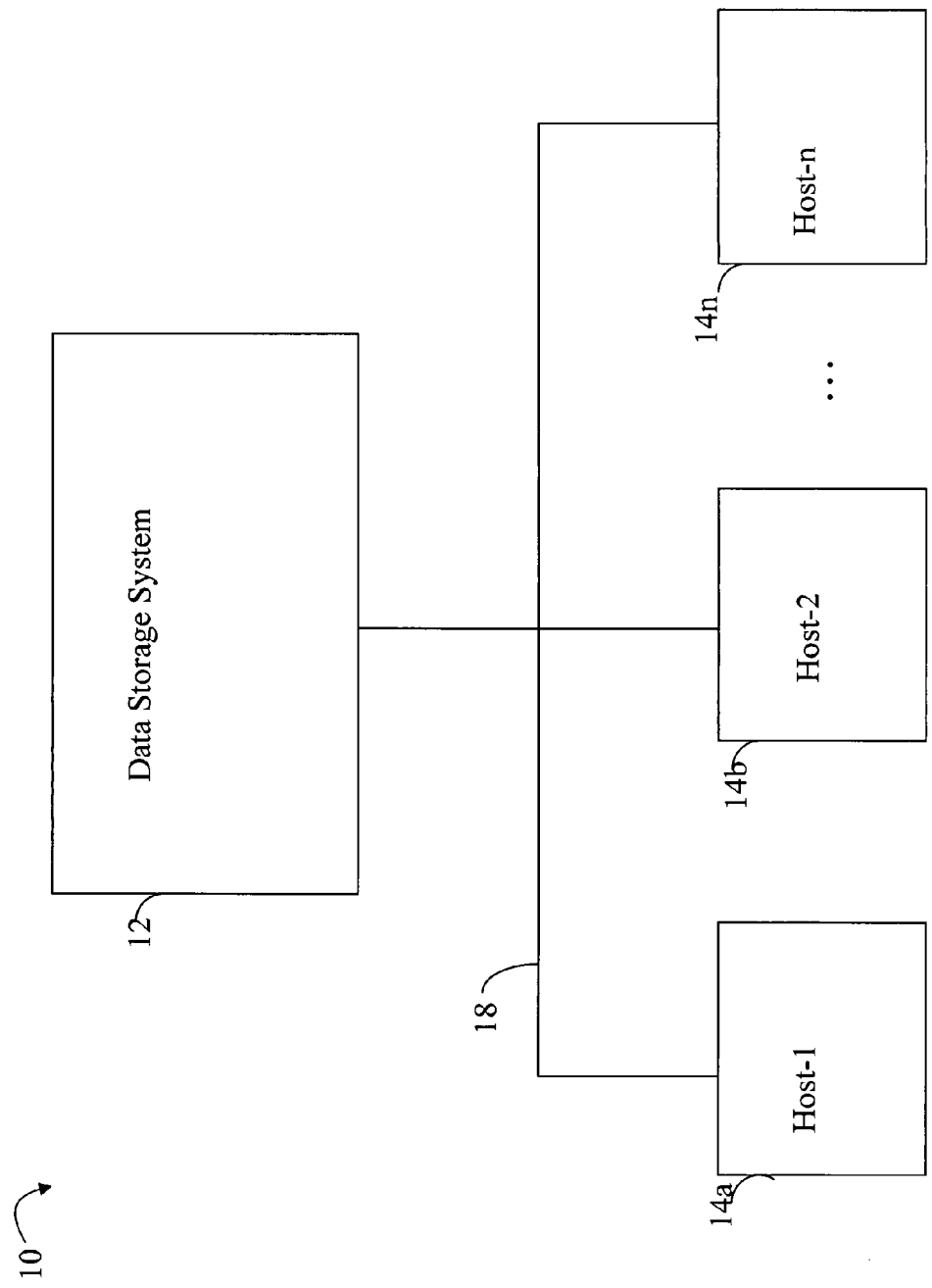
FIG. 1 is an example of an embodiment of a computer system that may utilize the techniques described herein.

Referring now to FIG. 1, shown is an example of an embodiment of a computer system that may be used in performing the techniques described herein. The computer system 10 includes a data storage system 12 connected to host systems 14a-14n through communication medium 18. In this embodiment of the computer system 10 and the N hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage system 12, and may also communicate with others included in the computer system 10.

Each of the host systems 14a-14n and the data storage system 12 included in the computer system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particulars of the hardware and software included in each of the components that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the computer system 10 may use a variety of different communication protocols such as SCSI, Fibre Channel, or iSCSI, and the like. Some or all of the connections by which the hosts and data storage system 12 may be connected to the communication medium 18 may pass through other communication devices, such as a Connectrix or other switching equipment that may exist such as a phone line, a repeater, a multiplexer or even a satellite.

Each of the host computer systems may perform different types of data operations in accordance with different types of administrative tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

Figure 2A:
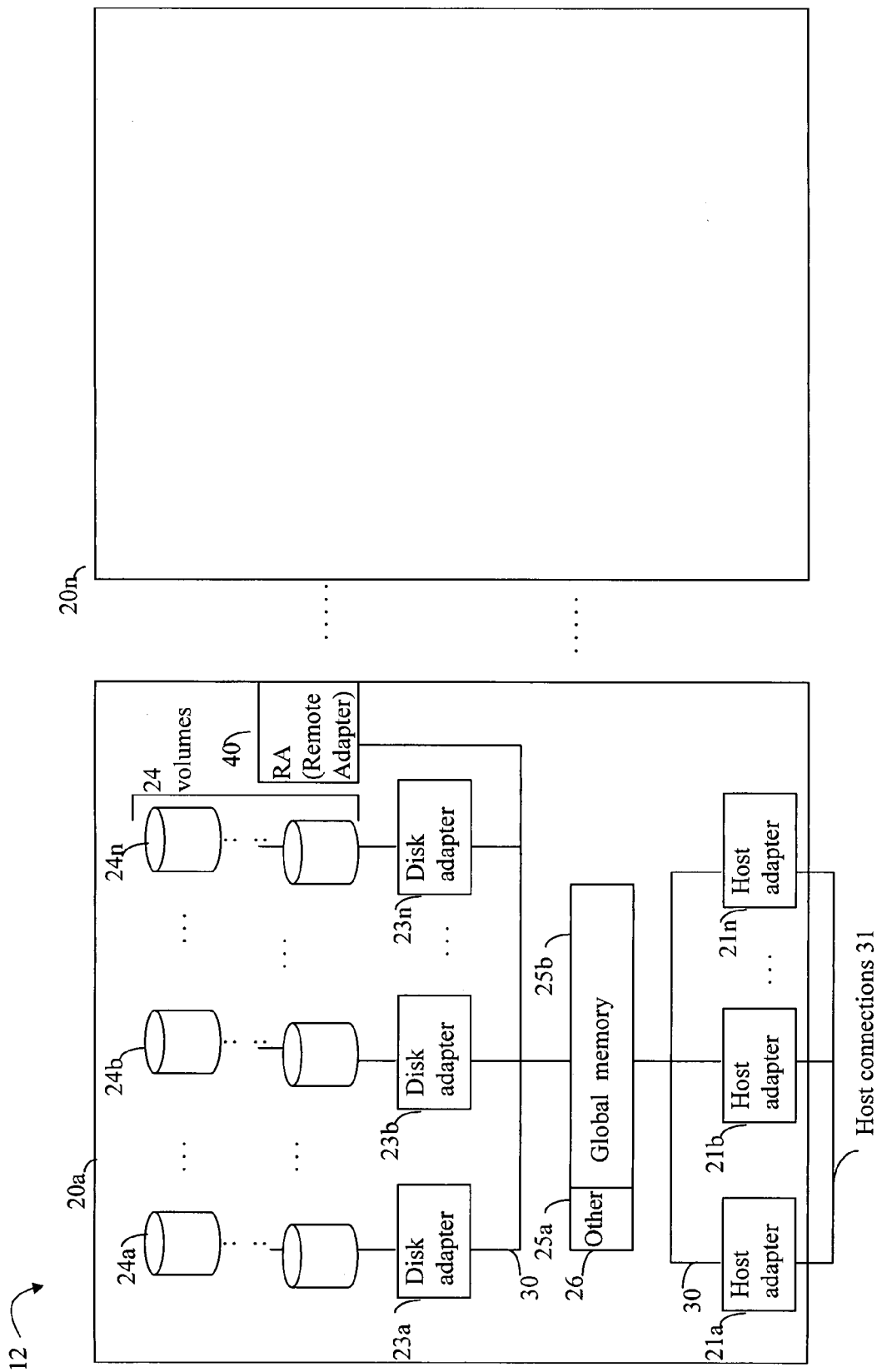
FIG. 2A is an example of an embodiment of a data storage system.

Referring now to FIG. 2A, shown is an example of an embodiment of the data storage system 12 that may be included in the computer system 10 of FIG. 1. Included in the data storage system 12 of FIG. 2A are one or more data storage systems 20a-20n as may be manufactured by one or more different vendors. Each of the data storage systems 20a-20n may be inter-connected (not shown). Additionally, the data storage systems may also be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20a. It should be noted that a similar more detailed description may also apply to any one or more of the other elements, such as 20n, but have been omitted for simplicity of explanation. It should also be noted that an embodiment may include data storage systems from one or more vendors. Each of 20a-20n may be resources included in an embodiment of the computer system 10 of FIG. 1 to provide storage services to, for example, host computer systems. It should be noted that the data storage system 12 may operate stand-alone, or may also included as part of a storage area network (SAN) that includes, for example, other components.

Each of the data storage systems, such as 20a, may include a plurality of disk devices or volumes, such as the arrangement 24 consisting of n rows of disks or volumes 24a-24n. In this arrangement, each row of disks or volumes may be connected to a disk adapter ("DA") or director responsible for the backend management of operations to and from a portion of the disks or volumes 24. In the system 20a, a single DA, such as 23a, may be responsible for the management of a row of disks or volumes, such as row 24a.

The system 20a may also include one or more host adapters ("HAs") or directors 21a-21n. Each of these HAs may be used to manage communications and data operations between one or more host systems and the global memory. In an embodiment, the HA may be a Fibre Channel Adapter or other adapter which facilitates host communication.

One or more internal logical communication paths may exist between the DA's, the RA's, the HA's, and the memory 26. An embodiment, for example, may use one or more internal busses and/or communication modules. For example, the global memory portion 25b may be used to facilitate data transfers and other communications between the DA's, HA's and RA's in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Also shown in the storage system 20a is an RA or remote adapter 40. The RA may be hardware including a processor used to facilitate communication between data storage systems, such as between two of the same or different types of data storage systems.

Host systems provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. The HAs may be used in connection with communications between a data storage system and a host system. The RAs may be used in facilitating communications between two data storage systems. The DAs may be used in connection with facilitating communications to the associated disk drive(s) and LV(s) residing thereon.

The DA performs I/O operations on a disk drive. In the following description, data residing on an LV may be accessed by the DA following a data request in connection with I/O operations that other directors originate.

Figure 2B:
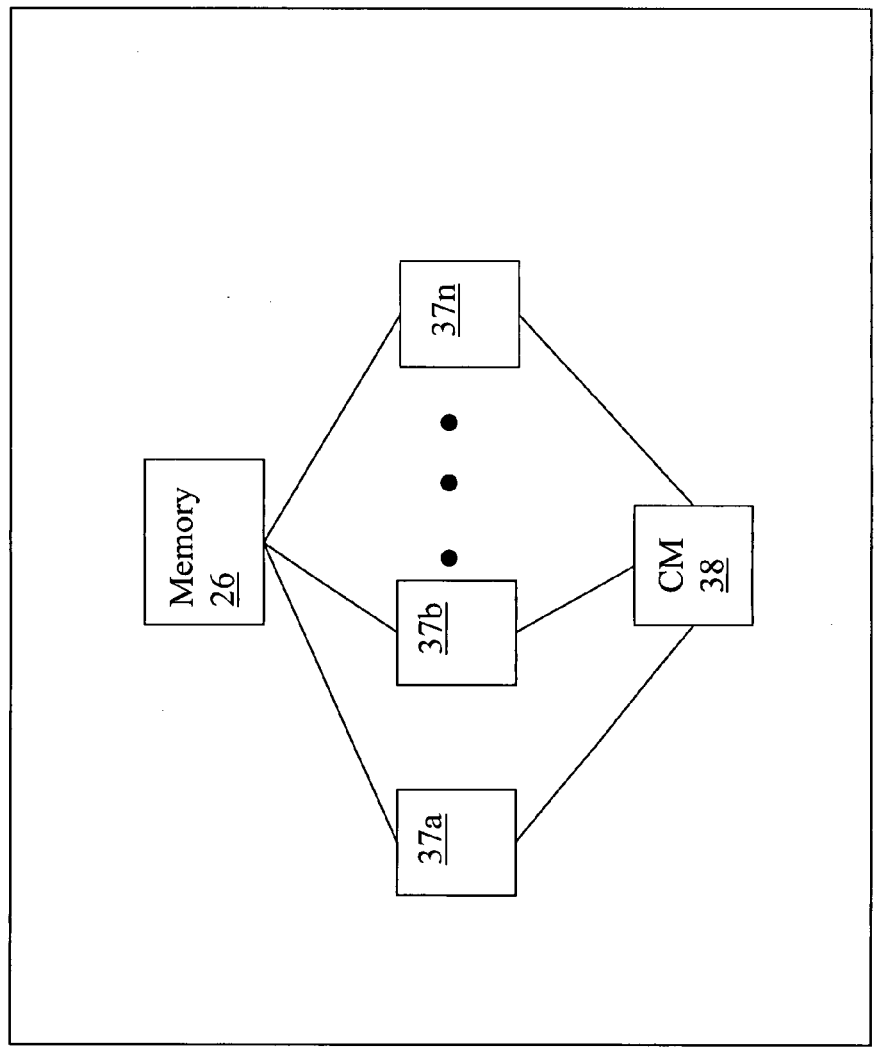
FIG. 2B is a representation of the logical internal communications between the directors and memory included in one embodiment of the data storage system of FIG. 2A.

Referring now to FIG. 2B, shown is a representation of the logical internal communications between the directors and memory included in a data storage system. Included in FIG. 2B is a plurality of directors 37a-37n coupled to the memory 26. Each of the directors 37a-37n represents one of the HA's, RA's, or DA's that may be included in a data storage system. In an embodiment disclosed herein, there may be up to sixteen directors coupled to the memory 26. Other embodiments may use a higher or lower maximum number of directors that may vary.

The representation of FIG. 2B also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

Figure 3:
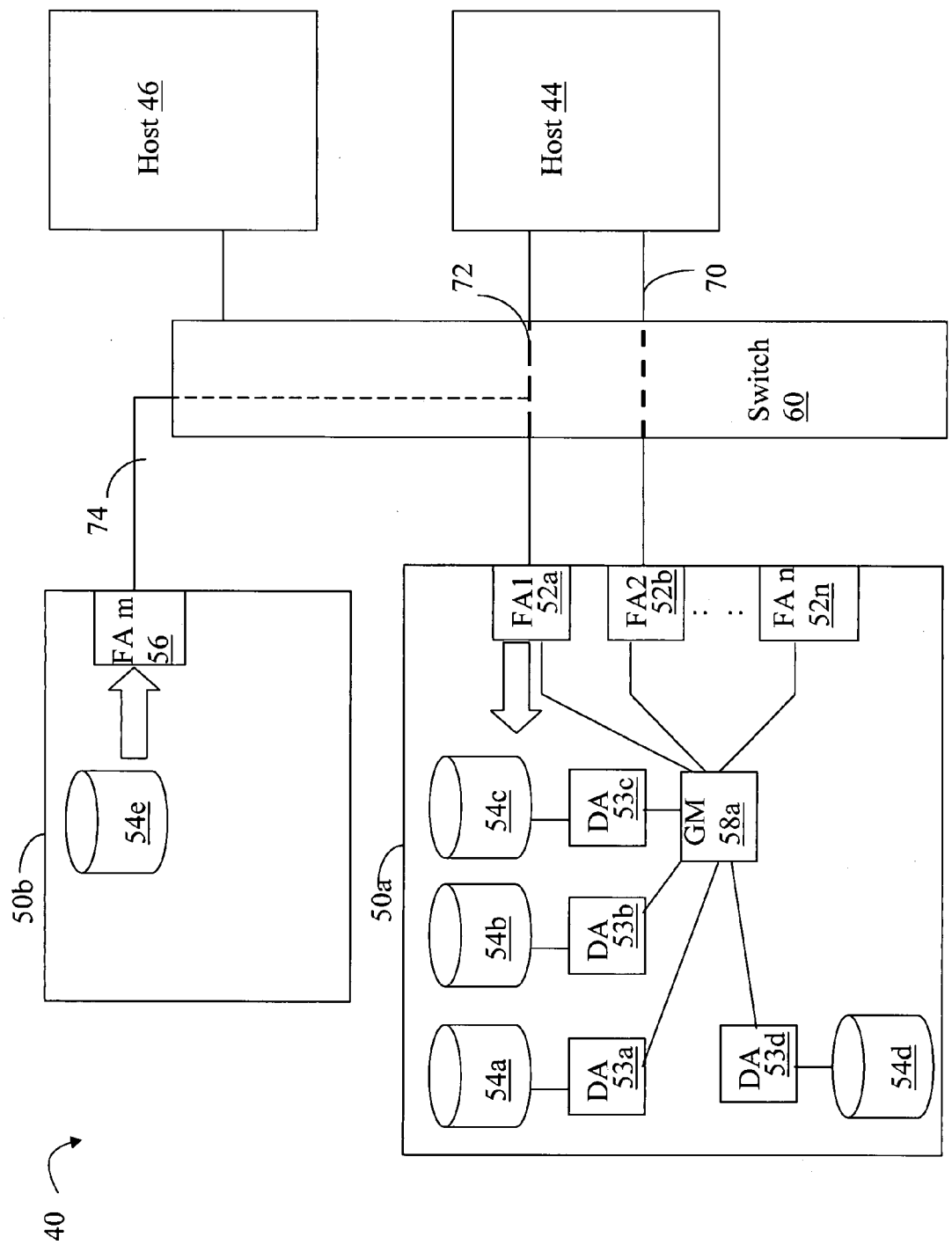
FIGS. 3 and 4 are examples of systems in which the techniques herein may be performed.

Referring now to FIG. 3, shown is an example of an embodiment of a computer system 40 that may be used in connection with the techniques described herein. It should be noted that the embodiment illustrated in FIG. 3 presents a simplified view of some of the components of a computer system as generally illustrated in FIGS. 1 and 2A, for example, including only some detail of the data storage systems 50a and 50b for the sake of illustration.

Included in the system 40 are the data storage systems 50a and 50b, a switch 60 and hosts 44 and 46. The data storage system 50a and the hosts 44,46 may communicate using switch 60. In this example, the data storage system 50a includes data storage devices 54a-54d, DAs 53a-53d, global memory (GM) 58a, and multiple Fibre Channel Adapters (FAs) 52a-52n. Each of the FAs 52a-52n has a Fibre Channel connection to the switch 60 to facilitate communications with the hosts 44,46. For example, the host 44 may issue a command in the form of one or more messages to data storage system 50a through switch 60 over path 70 or 72 to one of the FAs 52a-52n. Similarly, the switch 60 may be used to communicate messages from the data storage system 50a to the host 44. In one embodiment, the switch 60 may be an 8 port switch although a switch used in connection with the techniques herein may include any number of ports.

In the example 40, the host 44 may communicate with the data storage system 50a over one or more paths such as 70 and 72. Embodiments in which data operations can be communicated from one or more hosts to the data storage system over more than one path may be characterized as a multipath environment with respect to host-data storage system communications. In other words, multipathing allows for two or more data paths to the data storage system to be simultaneously used for read and/or write operations. Host 46 may communicate with host 44 as well as data storage systems 50a and 50 using switch 60 although particular paths are not illustrated in this example.

The switch 60 may also be used in connection with communications between the data storage system 50a and the data storage system 50b. It should be noted that additional details regarding data storage system 50b have been omitted for sake of simplicity and illustration but also include DAs, GM, and the like, as included in the data storage system 50a. In this example, the data storage system 50b may include a Fibre Channel Adapter, FA m 56, and a storage device 54e.

For purposes of discussion in following paragraphs, data storage system 50b may be referred to as target data storage system, and data storage system 50a may be referred to as a source data storage system.

A device, such as each of 54a and 54e, may refer to a logical device or logical volume. Each of the logical devices in the source data storage system and target data storage system has a size or capacity that may be expressed in terms of device geometry. The device geometry may include device geometry parameters regarding the number of cylinders in the device, the number of heads or tracks per cylinder, and the number of blocks per track. The device capacity expressed in blocks may be represented as a mathematical product of the foregoing parameters. Each logical device may be divided into one or more partitions. Each logical device partition may be defined in a partition definition structure in terms of values affected by the device geometry parameters. For example, a partition may be defined as having a start cylinder and an end cylinder. The device geometry of the data storage system upon which the device is configured and the partition definition structure may be stored as metadata in a logical device descriptor or label on the device.

Logical device 54a may have a first geometry with values for the 3 parameters as described above. The number of tracks per cylinder and the number of blocks per track may be determined in accordance with characteristics of the data storage system 50a. The number of cylinders in the device 54a may be a configurable parameter, such as determined from a system configuration file. Logical device 54e may have a second geometry expressed in terms of values for the 3 parameters described above. The second geometry for the logical device 54e may be different from the first geometry of the logical device 54a in that one or more parameter values may differ. Such a difference may occur, for example, if the number of blocks in a track as used by each of the data storage systems 50a and 50b differs, or if the number of tracks in a cylinder for each of the logical devices 54a and 54e differs.

Data from a source logical device, such as 54e, may be copied to a target logical device, such as 54a. In connection with this copying, the descriptor from 54e is copied to 54a. Thus, the target logical device's descriptor includes information indicating geometry parameters of the first source logical device in the data storage system 50b. A problem may arise when performing an operation to add, delete, or modify an existing partition on the target device resulting in a modification to the partition definition structure of the device descriptor for the target device. When performing such an operation to update the partition information and rewrite the device descriptor, a discrepancy is determined between the device geometry parameters as stored in the target device's descriptor (e.g., reflecting those in accordance with the source data storage system 50b) and the device geometry parameters of the target device in the target data storage system 50a. Existing techniques detecting the foregoing discrepancy may presume that there has been data corruption to the target device's descriptor resulting in subsequent processing that may be undesirable, such as ignoring the data included in the target device's descriptor and/or reinitializing the target device's descriptor. Furthermore, as a result of the foregoing, the dat stored on the device may be lost due to an inability to accurately retrieve the data since the partition table has changed.

As such, techniques will now be described which address the above-referenced problem when relocating data from a logical device having a device geometry to a second logical device having a different device geometry. For example, the techniques herein may be used to migrate or copy data from one or more logical devices of a first data storage system to a second data storage system having a different number of blocks per track than the first data storage system. The techniques described herein provide for mapping or translating information contained in the device descriptor and the associated data partitions of the source logical device for use in the target data storage system.

Referring back to FIG. 3, in one embodiment as illustrated herein, the FA1 52a may be used in connection with migrating or copying data from data storage system 50b to 50a over connection 74. Any one of a variety of different techniques may be used in connection with migrating data from a device of 50b, such as device 54e, to a device of 50a, such as device 54a. In this example illustrated in FIG. 3, a technique referred to as a data pull migration technique is illustrated. With the data pull model, the system including the FA controlling the migration process functions as the target (e.g.; system 50a) by pulling or copying data from another source system, such as 50b. An example of techniques that may be used in connection with online data migration are described in U.S. patent application Ser. No. 10/879,383, filed on Jun. 29, 2004, ONLINE DATA MIGRATION, which is incorporated herein by reference. U.S. patent application Ser. No. 10/879,383 describes techniques for migration of data from a source to a target using the data pull technique. In connection with copying or migrating the data, the FA1 52a may execute code of a migration process to perform the copying or migration of data from 54e to 54a. In connection with performing the copy operation, one or more partitions from a source logical device may be copied to a target logical device. In one embodiment, the copy operation, along with other processing steps that will be described herein, may be controlled by a host, such as host 44, issuing commands to the target data storage system 50a. The system 50a may then communicate with the system 50b and/or the host 44 in connection with performing processing steps of the techniques herein.

Figure 4:
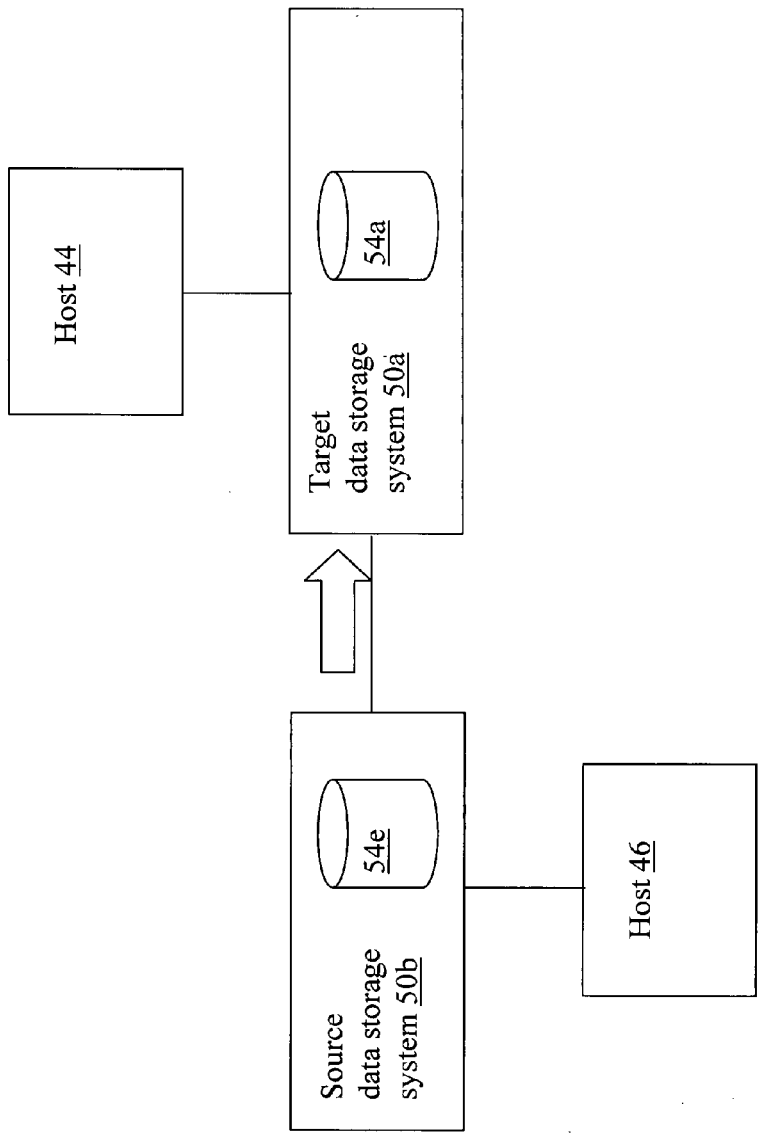

Referring now to FIG. 4, shown is an example representation of a system that may be used in connection with the techniques herein. The example 80 may be a different representation of components of FIG. 3. The host 46 may perform various data operations in connection with devices, such as 54e, of the source data storage system 50b. At a later point in time, there may be a need to migrate data from device 54e, and possibly other devices of the system 50b, to the system 50a. In connection with techniques described in following paragraphs, the host 44 connected to the target data storage system 50a may initiate and control processing. The host 44 may issue one or more system calls to the system 50a. The system call may be a vendor-specific control command issued from one data storage system to another to perform one or more processing operations. In turn, the data storage system 50a may communicate with the data storage system 50b to obtain information used by the host 44. The host 44 may perform processing to generate a new device descriptor for device 54a in accordance with the device geometry of the target data storage system. The new device descriptor for device 54a may be a translation or mapping of the device descriptor of device 54e having a first geometry. This is described in more detail in following paragraphs. Additionally, the data storage system 50a may copy or migrate data from device 54e to 54a using the data pull technique described in U.S. patent application Ser. No. 10/879,383. The data may be mapped from the source device 54e having a source device geometry to the target device 54a having a target device geometry. The data mapping process may include relocating data from a first location on the source device to a corresponding second location on the target device in accordance with the different device geometries. This will also be described in more detail in following paragraphs.

Figure 5:
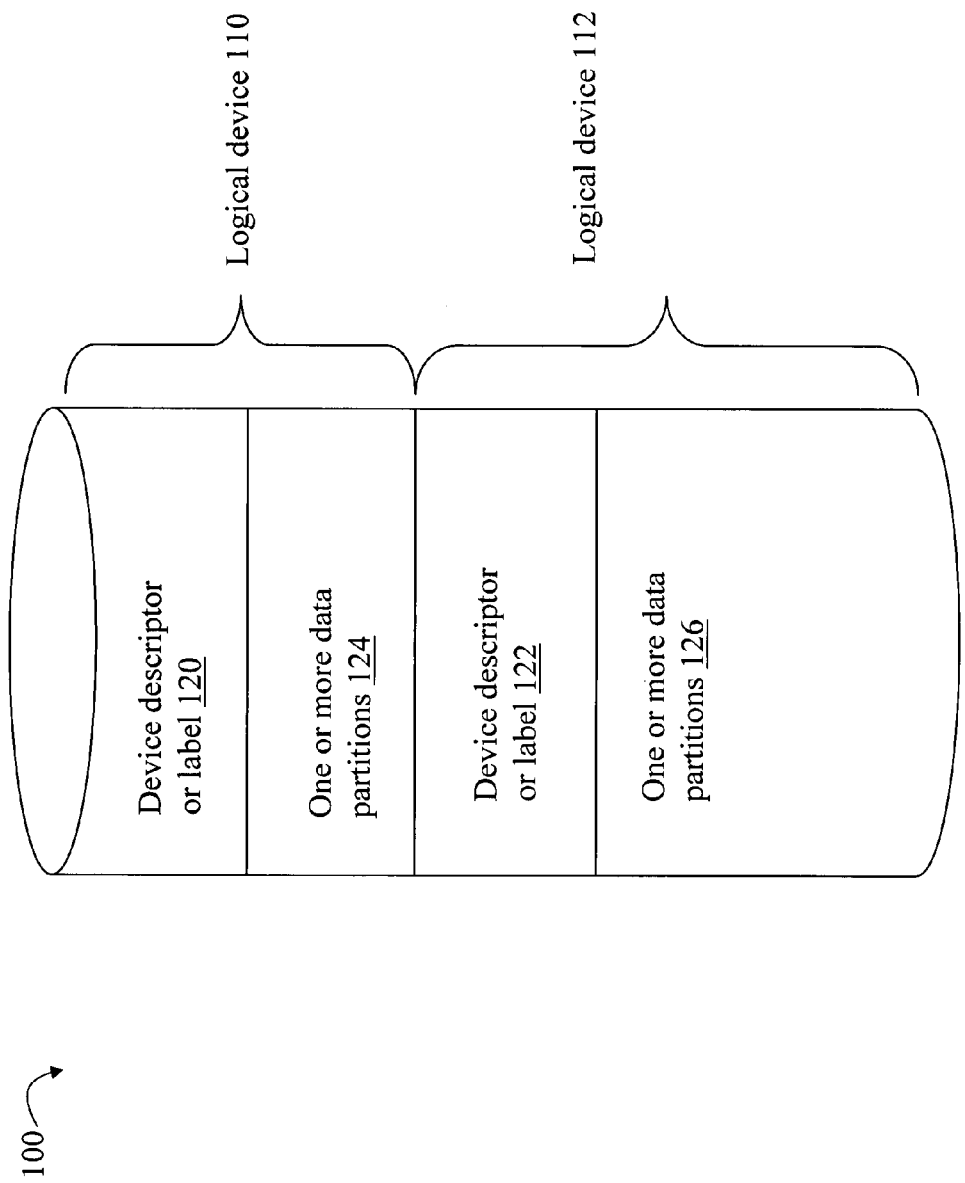
FIG. 5 is an example of information that may be included in logical devices.

Referring now to FIG. 5, shown is an example representation of logical devices as may be included in the source and target data storage systems. The example 100 includes two logical devices that may be stored on one or more physical devices. The logical device 110 includes a device descriptor or label 120 and one or more data partitions 124. The logical device 112 includes a device descriptor or label 122 and one or more data partitions 126. It should be noted that a data storage system may include a different number of logical devices than as illustrated in the example 100. In FIGS. 3 and 4, only a single logical device, such as 110, is included in each of the systems 50a and 50b for purposes of illustrating the techniques herein.

Figure 6:
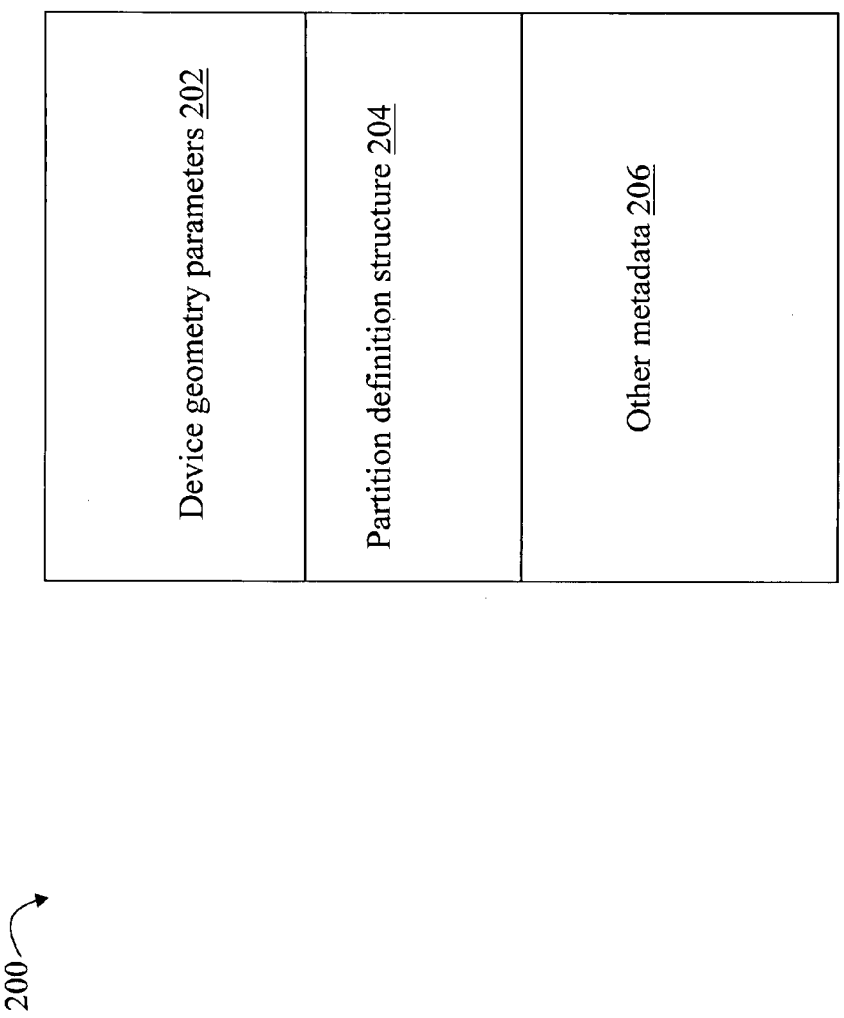
FIG. 6 is an example representation of a device descriptor or label.

Referring now to FIG. 6, shown is an example of a device descriptor. The example 200 illustrates additional detail of the device descriptor, such as may be included in 54a and 54e of FIG. 4. Each device descriptor includes metadata describing the user data placement on the device partitions. The example 200 includes one or more device geometry parameters 202, a partition definition structure 204 and other metadata 206.

Figure 7:
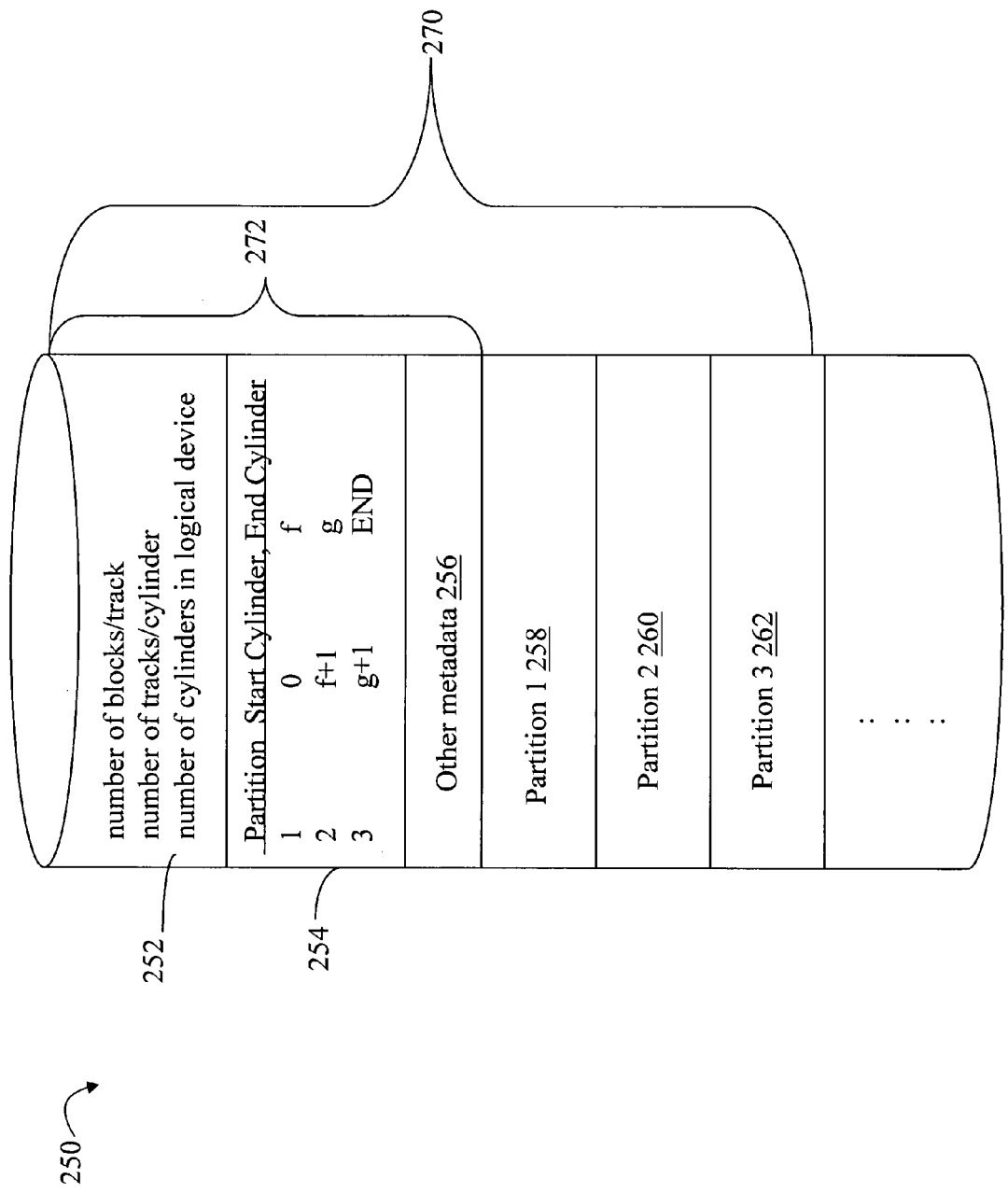
FIG. 7 is a more detailed illustration of information that may be included in a logical device.

Referring now to FIG. 7, shown is another representation of a logical device. The example 250 includes exemplary values to illustrate information that may be included in the logical device 270. The logical device 270 includes a device descriptor 272 followed by 3 data partitions 258, 260 and 262. The device descriptor 272 includes device geometry parameter values 252, a partition definition structure 254, and other metadata 256. The device geometry parameters include a first value indicating the number of blocks/track, a second value indicating the number of tracks/cylinder, and a third value indicating the number of cylinders allocated to the logical device 270. The total capacity or size of the logical device 270 expressed in blocks may be represented as a mathematical product of the foregoing three parameter values. The partition definition structure 254 may be structured as a table as illustrated in 254. Each partition has a line or entry in the table indicating a starting partition location and an ending partition location. In this example, the starting partition and ending partition locations are defined in terms of a cylinder number although other units, such as block numbers, may be used. In this example, the partitions are also illustrated as being contiguous but an embodiment may also utilize the techniques herein with partitions which are not contiguous. Additionally, the partitions may be of different sizes or all the same size. It should be noted that the partition definition structure may also include other partition-related information than as illustrated in FIG. 7.

In connection with techniques herein, processing steps will now be described in which the descriptor of the source logical device 54e is obtained, the device geometry of the target logical device 54a is obtained, and processing is performed to generate a descriptor for 54a. Validation processing may be performed to ensure that the data from the source device 54e may be migrated to the target device 54a. Once validation processing has been successfully completed, the descriptor for 54a may be written to the device and the data included in the one or more partitions of 54e may be copied to 54a.

With reference back to FIG. 4, the host 44 may issue a system call to the target data storage system 50a to obtain the device descriptor for the source device 54e. The data storage system 50a issues a request to the data storage system 50b to read and return the device descriptor for 54e. The descriptor may be obtained by retrieving the device descriptor data as stored on the device 54e. Subsequently, the target data storage system 50a returns the descriptor for 54e to the host 44. The system 50a may include code executed thereon, such as in one of the FAs or other components, to communicate with the data storage system 50b and return the descriptor for 54e to the host 44.

Once the host 44 has the descriptor for 54e, the host may issue one or more system calls to the target data storage system 50a requesting the device geometry for the target logical device 54a. In one embodiment, the host 44 may obtain the device geometry by issuing one or more SCSI commands to the target data storage system 50a, such as the SCSI Mode Sense 3 and 4 commands and the SCSI command to read the capacity of a device.

The host 44 then performs processing using the descriptor of source device 54e and the geometry of the target device 54a. The host 44 may translate or map the partition definition structure of the source device 54e to generate new partition definition structure in accordance with the geometry of the target device 54a. Such mapping may include appropriately modifying starting and ending partition locations in accordance with device geometry differences. For example, in an embodiment in which the start and end locations of partitions are defined in terms of cylinder numbers, if the source device 54e has a different number of blocks/track or a different number of tracks/cylinder than the target device 54a, the host appropriately maps each partition's starting and ending location to be in terms of the target device's geometry to produce mapped starting and ending locations. These mapped starting and ending locations may be included in the new partition definition structure for the target device 54a. This is further illustrated in following paragraphs with an example. It should be noted that the foregoing mapping may also take into account any boundary constraints, such as, for example padding that may occur if a partition must begin on a particular boundary location in the target data storage system.

FIG. 4 illustrates one exemplary embodiment in which the host is not connected directly to the source data storage system and therefore issues commands to the source data storage system indirectly through the target data storage system in connection with performing techniques described herein. It will be appreciated by those skilled in the art that variations of the foregoing exemplary embodiment are possible. For example, the host may also be directly connected to the source data storage system and the host may perform the techniques herein and by directly communicating with the source data storage system.

The host 44 may perform data validation processing. Data validation processing may include one or more checks used to ensure that the data migration can be successfully completed. In one embodiment, a first data validation check may be performed to ensure that the total capacity of the target device is greater than or equal to that of the source device. The total capacity expressed in blocks may be determined as a product of the device geometry parameter values as described elsewhere herein. As a second data validation check, the host may perform processing to determine whether the sum of the partition sizes, including any boundary constraints, fit on the target device. It should be noted that the foregoing determination may also take into account any boundary constraints, such as, for example padding that may occur if a partition must begin on a particular boundary location. The second data validation check may be performed by summing the sizes of the mapped partitions on the target device (e.g., may be determined using the mapped starting and ending locations) and comparing the sum to the capacity of the target device. A third data validation check that may be performed ensures that there are no overlapping partitions. For example, an embodiment may require that each mapped partition on the target device not overlap with another mapped partition on the target device. As a variation of the foregoing, an embodiment may allow partitions to overlap if an overlapping partition completely contains all those other partitions which it overlaps.

It should be noted that an embodiment may perform other data validation processing than as described above. In one embodiment, rather than perform the first data validation check above and compare a total number of block capacity for the source and target, a comparison may be made between the cylinder numbers of both the source and target devices. If the number of cylinders on the target is not greater than or equal to the number of cylinders of the target device, the data validation may fail. The foregoing may be performed without further considering the number of blocks/track and the number of tracks/cylinder.

Figure 7A:
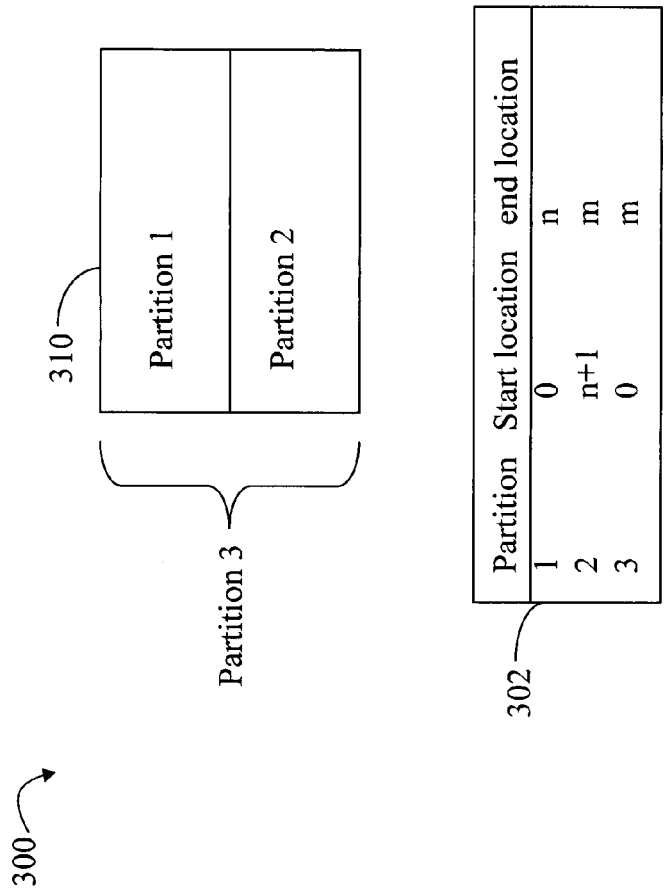
FIG. 7A is an example illustrating valid overlapping partitions.

Referring now to FIG. 7A, shown is an example illustrating allowable overlapping partitions. In the example 300, the partition definition structure 302 may define 3 partitions including a third partition which contains the first and second partitions. Additionally, an embodiment may also require that the boundaries of any overlapping partitions match those of partitions contained within. This is illustrated in the example 300 by the third partition having a starting location matching that of partition 1 and an ending location matching that of partition 2. Other embodiments may not require the matching boundaries but may rather require only that the partition 3 completely contain the other partitions 1 and 2. For example, in this latter instance, partition 3 may also be allowed to have an end location greater than m.

An embodiment may perform one or more of the foregoing data validation checks alone, or in addition to other data validation checks. The host may execute code thereon for performing the data validation checks.

Once the data validation checks performed on the host 44 have been successfully completed, the host 44 may issue a system call to write a new target device descriptor to the target device 54a on the target data storage system 50a. The target device descriptor includes the target device geometry as previously obtained from the target data storage system and the partition definition table with the mapped starting and ending partition locations in accordance with the target device geometry.

Once the target device descriptor has been written to the target device, the host may issue a system call to the target data storage system to initiate migration of the data from the source device to the target device. In one embodiment as described elsewhere herein, the host may issue a command to the target data storage system to invoke a migration process on the target data storage system which performs a block level copy using the data pull technique. The data may be pulled from the source to the target on a per partition basis with a single copy session for each partition. The start location of the partition on the source device may be the starting location as obtained from the source device's descriptor. The location on the target device to where the forgoing source device data is migrated may be determined in accordance with the mapped starting location of the partition as included in the mapped device descriptor of the target device.

Figure 8:
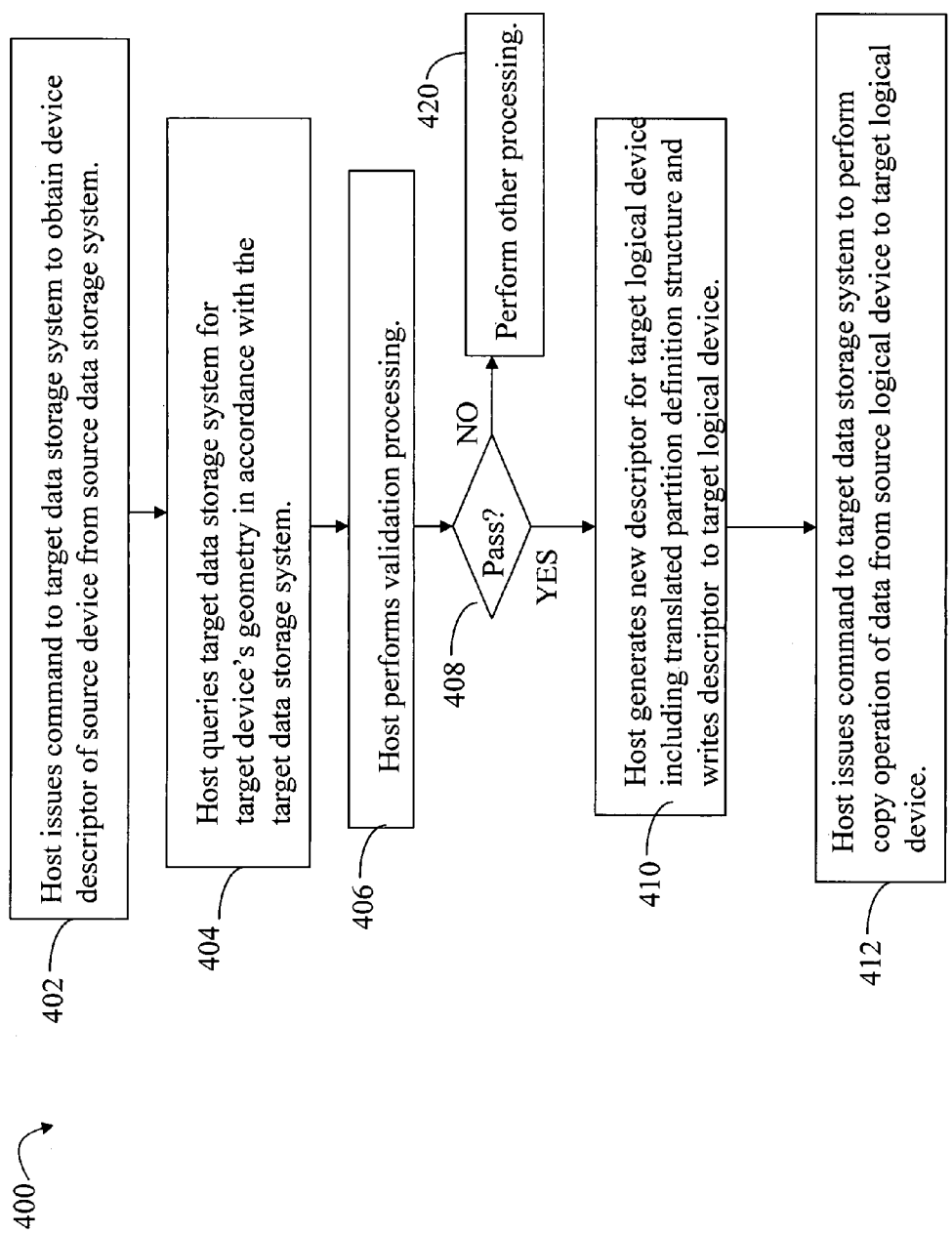
FIG. 8 is a example of a flowchart of processing steps that may be performed in an embodiment using techniques herein with a data pull technique.

Referring now to FIG. 8, shown is a flowchart of processing steps that may be performed in an embodiment utilizing the techniques herein. The flowchart 400 makes reference to components of FIGS. 3 and 4 and summarizes processing described above using the data pull technique. The host referred to in 400 is host 44 directly connected to the target data storage system 50a. At step 402, the host issues a command to the target data storage system to obtain the device descriptor of the source device. In response, the target data storage system communicates with the source data storage system instructing the source data storage system to read the descriptor from the source device and return the descriptor to the target data storage system. In turn, the target data storage system returns the source device's descriptor to the host. At step 404, the host issues one or more commands to the target data storage system to obtain the device geometry of the target device in accordance with the target data storage system. Part of step 404 processing may include mapping or translating the partition definition structure of the source device to a new partition definition structure in accordance with the target device's geometry. At step 406, the host may perform one or more data validation checks. Examples of such checks are described elsewhere herein. At step 408, a determination is made on the host as to whether the data validation checks have been successfully completed. If not, control proceeds to step 420 to perform other processing. Step 420 may include, for example, performing error processing in connection with the failed data validation checks. If step 408 evaluates to yes, control proceeds to step 410 where the host 44 generates a new descriptor for the target device. The new descriptor may include the target device's geometry and the new partition definition structure including the mapped partition locations determined in step 404. As part of step 408 processing, the new descriptor is written to the target device. At step 412, the host issues one or more commands to the target data storage system to commence the data migration. In one embodiment, the data migration may occur on a per-partition basis using a block-level data pull technique.

Figure 9:
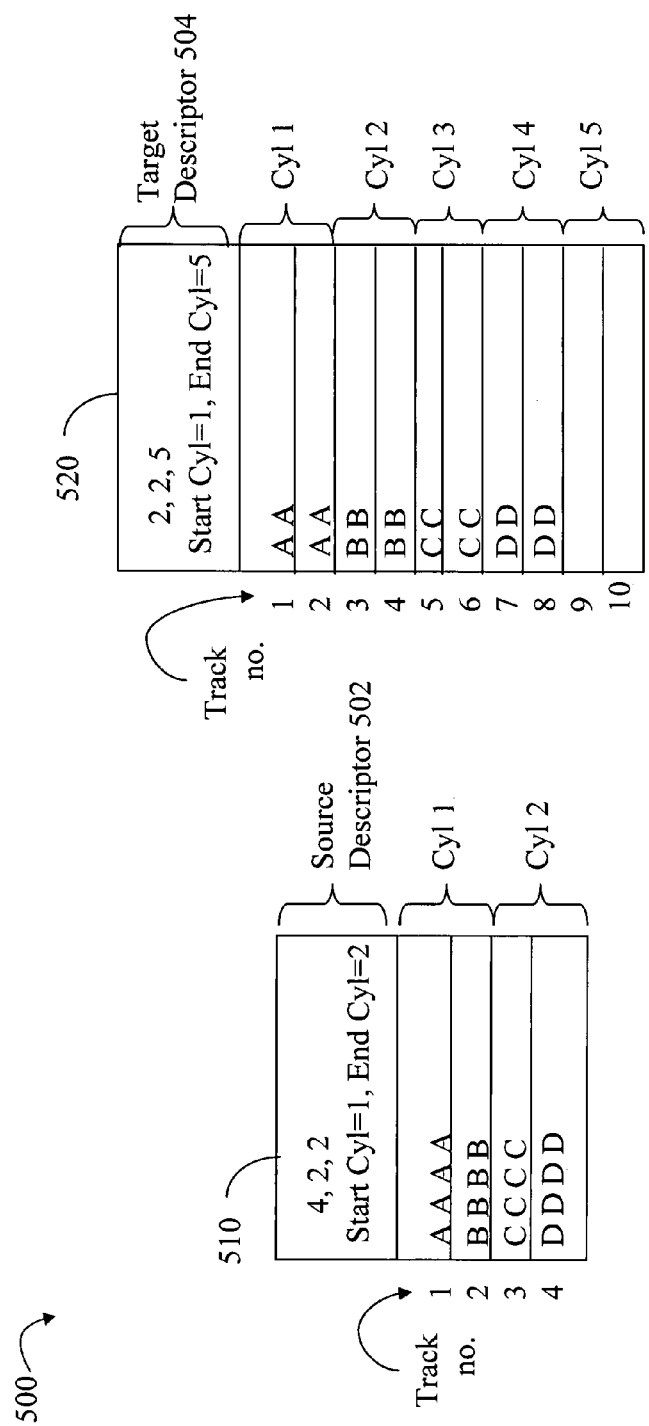
FIG. 9 is an example illustrating source and target devices in accordance with techniques herein.

Referring now to FIG. 9, shown is an example illustrating contents of source and target devices resulting from performing the techniques herein. It should be noted that the example 500 illustrates a single partition within a single logical device. The source device 510 includes a source descriptor 502 followed by 4 tracks of data of the single source partition of 510. The target device 520 includes a target descriptor 504 followed by 10 data tracks of the single target partition of 520. The source descriptor 502 includes a source device geometry of 4,2,2, indicating that there are 4 blocks/track, 2 tracks/cylinder and 2 cylinder in the source device. The single partition of 510 has a starting location of cylinder 1 (e.g., Cyl=1) and an ending location of cylinder 2 (e.g., Cyl=2). The target descriptor 504 includes a target devices geometry of 2,2,5 indicating that there are 2 blocks/track, 2 tracks/cylinder and 5 cylinder in the source device. The single partition of 520 has a starting location of cylinder 1 (e.g., Cyl=1) and an ending location of cylinder 5 (e.g., Cyl=5). In this example, the device geometries of the source and target devices differ with respect to 2 device geometry parameters, the first and the third. The source device has been created on a data storage system having twice as many blocks/track as that of the target data storage system. Additionally, the number of cylinder allocated for each logical device differs. The value for the third parameter of each logical device may be obtained from a configuration file as stored on each data storage system. In connection with the techniques herein, processing may be performed to map or translate the starting and ending locations of the single partition of the source device to starting and ending locations of the single partition in the target device. Subsequently, data from the partition may be copied to the target device and is stored in a location in accordance with the target device's geometry. For example, each block of data from track 1 of data on the source device is consecutively stored in the first two tracks on the target device.

As described in connection with techniques herein, an embodiment may perform data validation processing, for example, to determine if the capacity in blocks of the target device is greater than or equal to that of the source device. If the capacity of the target is greater than or equal to that of the source device, the data validation processing is deemed successful. In the example 500, the foregoing data validation processing is successful and processing may proceed to copy the data from the source to the target device.

Figure 10:
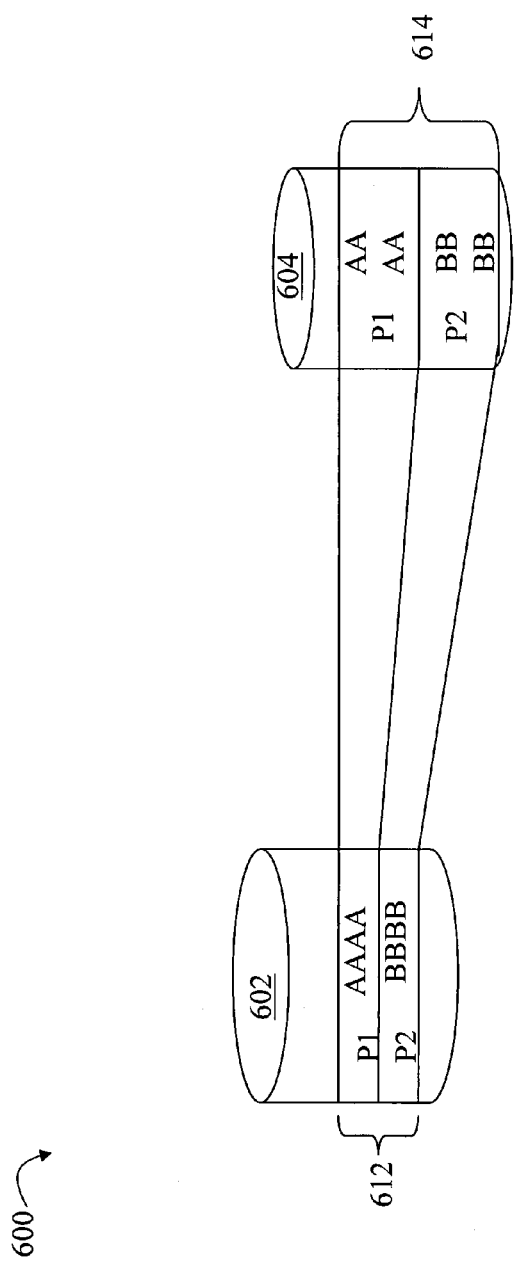
FIG. 10 is an example illustrating multiple, contiguous data partitions that may be used in connection with the techniques herein.

Referring now to FIG. 10, shown is another example illustrating a source and target device resulting from using the techniques herein. The example 600 includes a source device 602 having source partitions P1 and P2, and a target device 604 having corresponding target partitions P1 and P2. In this example, the techniques herein may be used to migrate two partitions of a logical device. The two partitions may represent logically consecutive partitions of the source device. Additionally, the source device may include only the partitions P1 and P2 so that the techniques herein are used to copy all partitions of the source device 602. Alternatively, the device 602 may also contain additional partitions which are not copied. In other words, the techniques herein may be used to migrate selected partitions from the source device to the target device 614.

Figure 11:
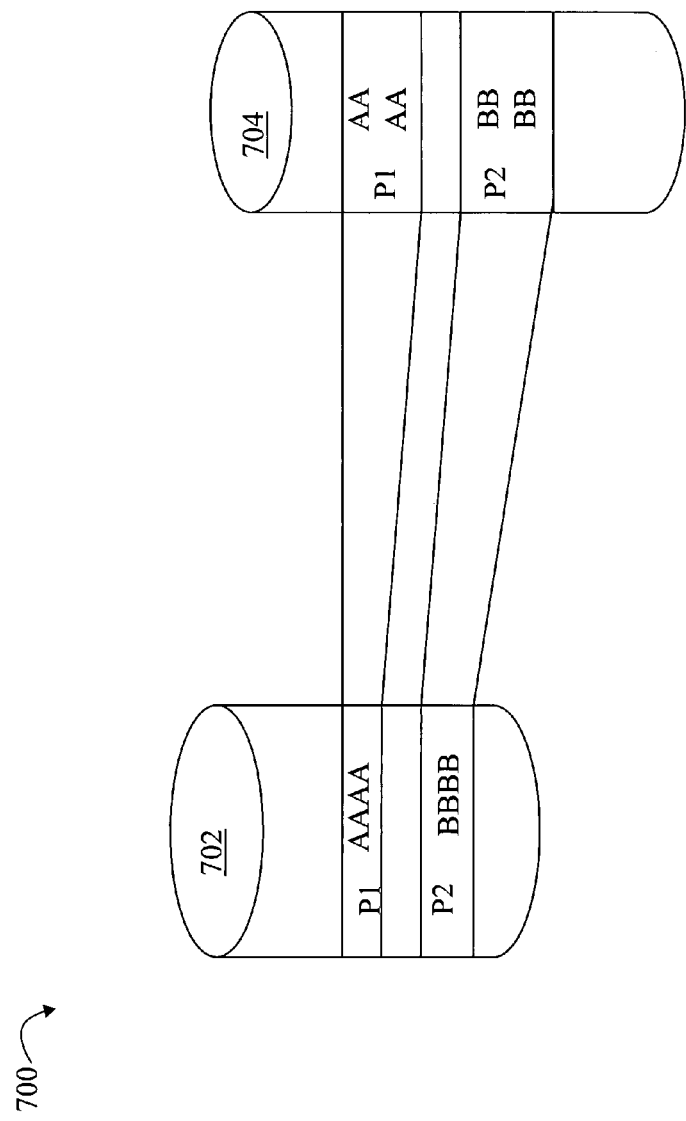
FIG. 11 is an example illustrating multiple, non-contiguous data partitions that may be used in connection with the techniques herein.

Referring now to FIG. 11, shown is another example illustrating a source and target device resulting from using the techniques herein. The example 700 includes a source device 702 having source partitions P1 and P2, and a target device 704 having corresponding target partitions P1 and P2. In contrast to FIG. 10, the partitions migrated in the example 700 are not logically consecutive partitions. In other words, the partition definition structure may define another partition in between P1 and P2 as represented on the source device 702.

Described above is an embodiment in which the host initiates and controls the processing steps performed in generating a new descriptor for the target device, performing data validation processing, and migrating the data partitions. The migration processing may be performed on a per-partition basis executing code included in one or more FAs of the target data storage system using a data pull technique. An embodiment may alternatively utilize a data push technique where data is pushed from the source data storage system to the target data storage system by code executing on the source data storage system. In such an embodiment using the data push technique, the host may issue a remote system call to the target data storage system in which the target data storage system instructs the source data system to initiate execution of a migration process thereon to push the data to the target data storage system. The data push technique is also described in more detail in U.S. patent application Ser. No. 10/879,383.

As another variation to an embodiment using the data pull technique, rather than have the host issue individual commands to perform each of the processing steps as outlined in FIG. 8, steps from FIG. 8 may be performed by the target data storage system automatically as part of the migration processing code on the target data storage system. This is now described in more detail.

Figure 12:
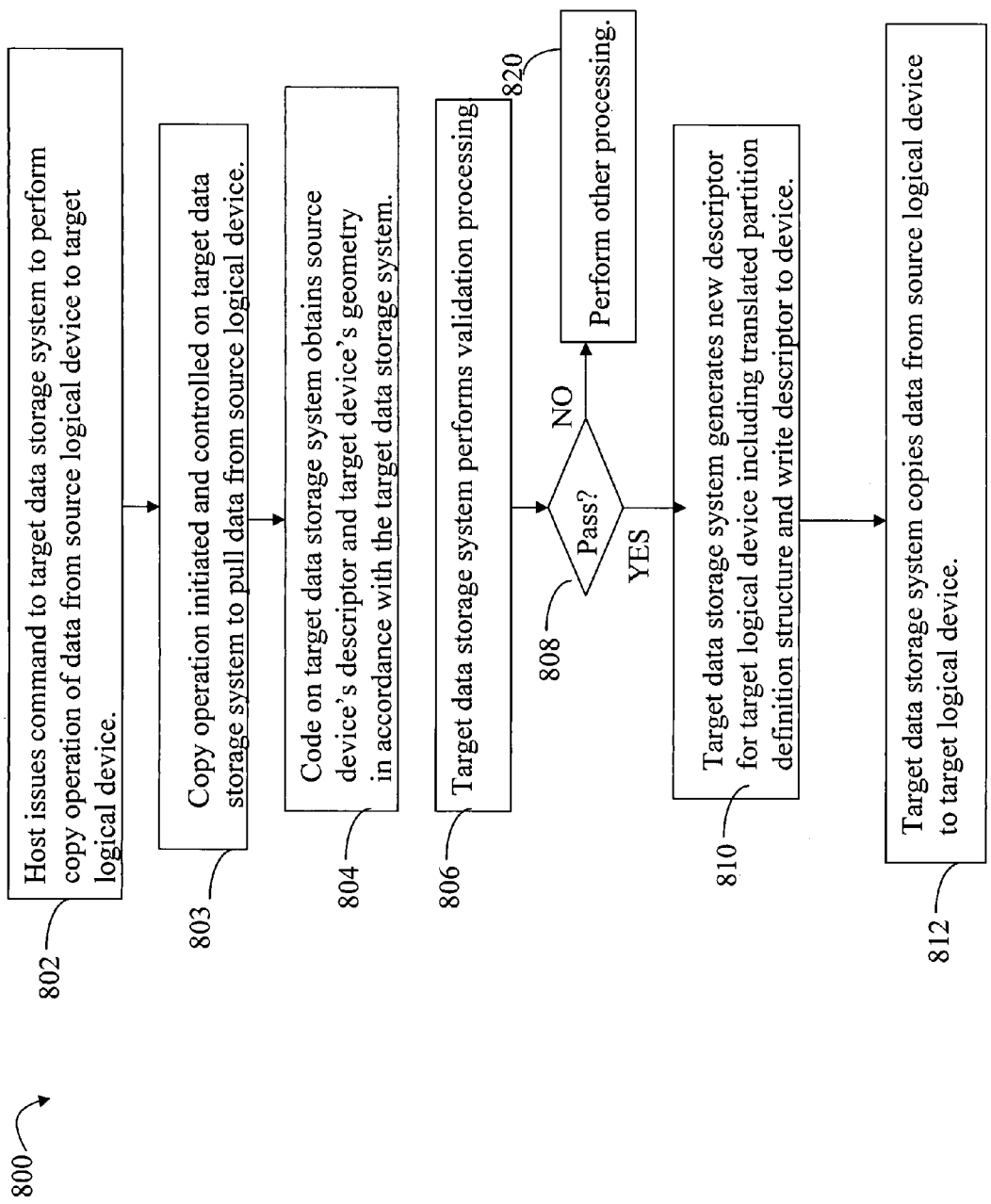
FIG. 12 is another flowchart of processing steps that may be performed in an embodiment using techniques herein with a data pull technique.

Referring now to FIG. 12, shown is a flowchart of processing steps that may be performed in an embodiment utilizing the techniques herein in which generation of the new descriptor for the target device and the data validation processing are performed by the target data storage system. The example 800 utilizes the data pull technique by executing a migration process on the target data storage system so that the target data storage system controls the data migration. At step 802, the host 44 issues a command to the target data storage system to perform a copy operation pulling data from the source to the target logical device. At step 804, the copy operation using the data pull technique is initiated on the target data storage system. The migration process code on the target data storage system may be stored on and executed by an FA as described in more detail in U.S. patent application Ser. No. 10/879,383. Additionally, the migration process code may include instructions to perform steps 804, 806, 808, 810, and 820 of the example 800. Steps 806, 808, 810, 812 and 820 of FIG. 12 are respectively analogous to steps 406, 408, 410, 412 and 420 of FIG. 8 except that those steps of FIG. 12 are initiated and performed by the target data storage system rather than the host.

As a variation to processing of FIG. 12 in an embodiment utilizing a data push technique rather than a data pull technique, step 812 may be replaced with a new step in which the target data storage system instructs the source data storage system to commence migration processing using the data push technique.

The foregoing sets forth exemplary embodiments in which there is a single FA performing the migration process using a data push or a data pull technique. An embodiment may also have more than one FA executing code to perform migration processing copying data from the source to the target device. For example, an embodiment using a data push model may have multiple FAs in the source data storage system each executing processes and performing processing to copy data from the source to the target device. In such an embodiment, there are multiple migration sessions, one on each FA pushing data from the source data storage system to the target data storage system.

Figure 13:
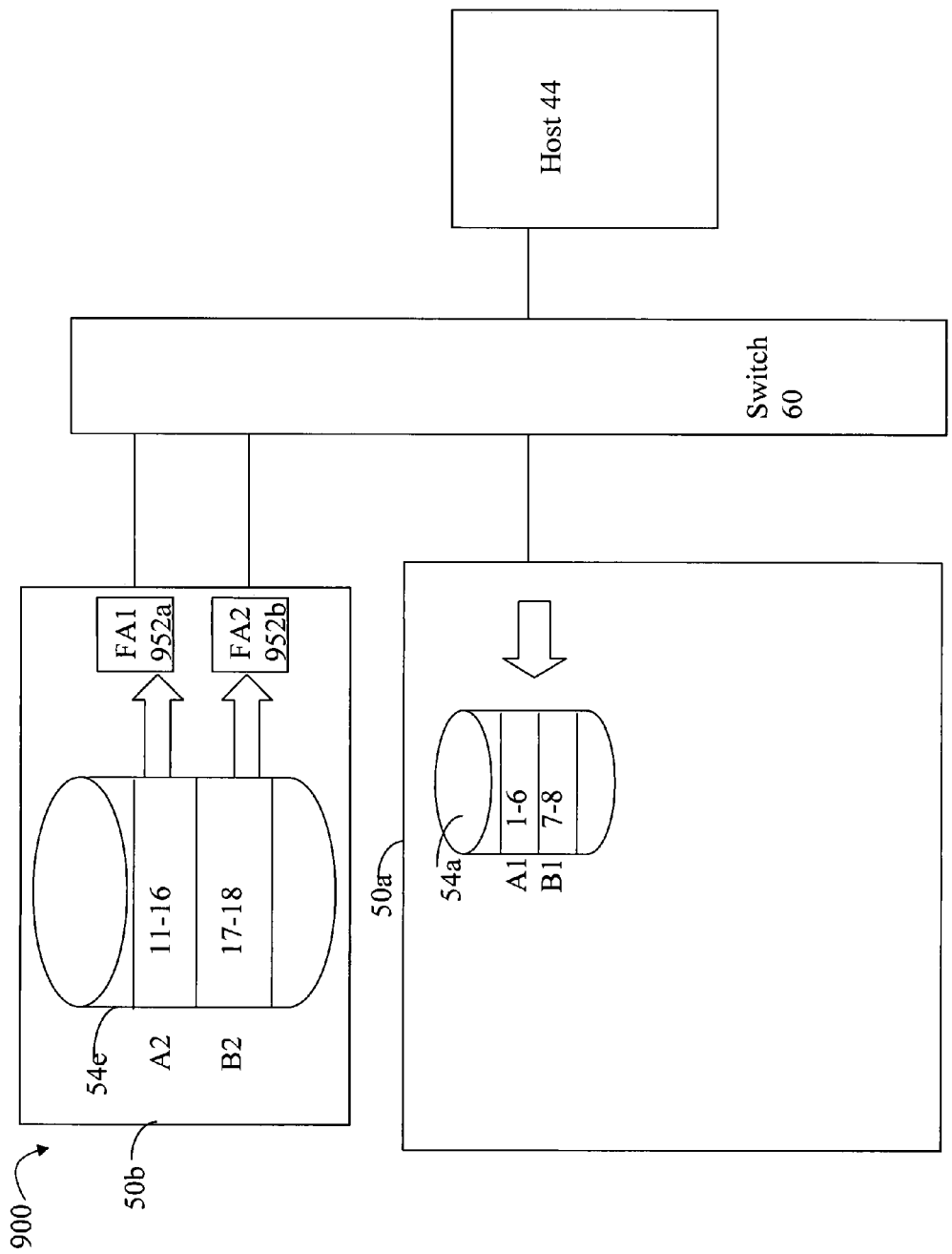
FIGS. 13 and 14 are examples of various embodiments utilizing distributed copying in connection with techniques herein for data migration.

Referring now to FIG. 13, shown is an example of an embodiment illustrating a data push migration technique with multiple migration sessions. In the example 900, the source data storage system is 50b and the destination or target data storage system is 50a. Components of FIG. 13 which are similar to those as described elsewhere herein in connection with other figures. In the example 900, the FAs 952a and 952b of the data storage system 50e each have a migration session. Each of the migration sessions and other processing on the FAs may operate independently of processing performed on other FAs. A first migration session may be associated with FA1 952a in which a first instance of a migration process is executing. FA1 952a copies or migrates data from A2 of device 54e to a portion A1 of device 54a. A second migration session may be associated with FA2 952b in which a second different instance of a migration process is executing. FA2 952b copies or migrates data from B2 of device 54e to another portion B1 of device 54a. FA1 952a and FA2 952b each may execute code to migrate data from 54 push technique to migrate data as illustrated in FIG. 13.

Use of a distributed technique in which multiple FAs of a source data storage system migrate data to a target using a data push model as illustrated in FIG. 13 is described, for example, in U.S. patent application Ser. No. 10/880,279, filed on Jun. 29, 2004, DISTRIBUTED WORKFLOW TECHNIQUES, which is incorporated herein by reference.

In an embodiment utilizing the distributed techniques with a data push model, processing of step 412 of FIG. 8 may be replaced with the host issuing a remote system call to the source data storage system to perform the distributed processing for data migration. In another embodiment in which the distributed techniques with the data push model are utilized, step 812 of FIG. 12 may be replaced with a step in which the target data storage system issues a command to the source data storage system to perform the distributed processing for data migration.

Figure 14:
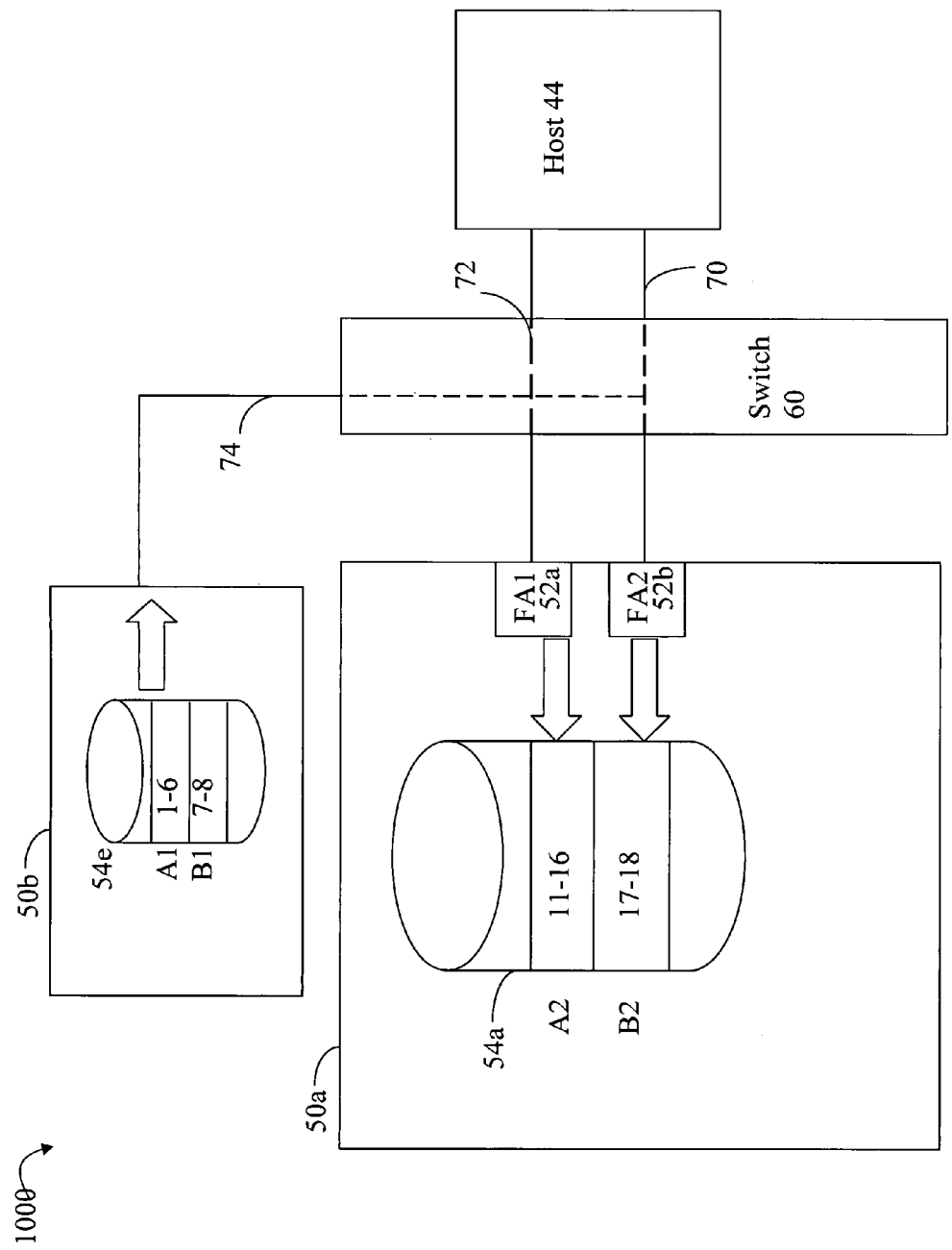

The distributed techniques in connection with a data pull model with multiple migration sessions may also be used in connection with the techniques herein. An example of such a data pull model utilizing the distributed technique is illustrated in FIG. 14 and is also described, for example, in U.S. patent application Ser. No. 10/880,279.

Referring now to FIG. 14, shown is an example of an embodiment illustrating a data pull migration technique with multiple migration sessions. In the example 1000, the source data storage system is 50b and the destination or target data storage system is 50a. Components of FIG. 14 which are similar to those as described elsewhere herein in connection with other figures have similar element numbers. In the example 1000, the FAs 52a and 52b of the data storage system 50a each have a migration session. Each of the migration sessions and other processing performed by the FAs may be done independently of other migration sessions. The migration process executing on each of the FAs of 50a is pulling data from a source device of 50b. In this example, a first migration pull session of FA1 52a is pulling or copying data from portion A1 of device 54e to portion A2 of device 54a. A second migration pull session of FA2 52b is pulling or copying data from portion B1 of device 54e to portion B2 of device 54a. FA1 52a and FA2 52b each may execute processes in which the migration process uses a data pull technique to migrate data.

In an embodiment utilizing the distributed techniques with a data pull model, processing of step 412 of FIG. 8 may be replaced with the host issuing a system call to the target data storage system to perform the distributed processing for data migration. In another embodiment in which the distributed techniques with the data pull model are utilized, step 812 of FIG. 12 includes the target data storage system performing the data migration using the distributed processing technique as illustrated in FIG. 14.

In connection with embodiments described above, the host may perform processing in connection with migrating the data from the source device to the target device in which the source device is included in a source data storage system that is not directly connected to the host. The source data storage system including the source device may be only indirectly connected to the host through a target data storage system including the target device. As part of the data migration process, the partition definition structure of the source device is translated or mapped to generate a new partition definition structure in accordance with the device geometry of the target device. The mapping process includes mapping starting and ending partition locations of the source device to corresponding starting and ending locations in the target device based on the device geometry of the target device. The processing may be controlled by the host issuing commands to perform multiple steps as described, for example, in FIG. 8. Alternatively, processing steps of FIG. 8 may be automatically performed as part of the migration process without action/initiation by the host other than an initial command to commence the process on the target data storage system.

It should be noted that in order to perform processing using the data pull or data push techniques described herein, the source and target data storage systems have the code stored thereon in one embodiment. In an alternate embodiment, if the source and/or target data storage systems do not have the code for performing the data push or data pull technique stored thereon, the code may be downloaded for execution to the data storage system to perform processing described herein. For example, the target data storage system may have the code stored thereon to perform the data push technique. Prior to invoking a migration process on the source data storage system to push data to the target data storage system, the target data storage system may download code for execution on the source data storage system if the necessary code is not already available on the source data storage system. The target data storage system may conclude that the data push migration process code is not on the source data storage system if the source data storage system is not from a vendor known to have the code stored thereon.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for migrating data from a source device to a target device comprising:

receiving a source device descriptor of the source device, the source device descriptor including source device geometry parameters and a source partition definition structure;

receiving target device geometry parameters;

translating the source partition definition structure and generating a mapped partition definition structure in accordance with the target device geometry parameters;

generating a target device descriptor including the target device geometry parameters and the mapped partition definition structure;

storing the target device descriptor on the target device; and migrating data for one or more partitions of the source device to the target device, wherein a host performs said generating and generates the target device descriptor and the host issues a command to a target data storage system including the target device to perform said storing to store the target device descriptor on the target device.

2. The method of claim 1, wherein the host is connected to the target data storage system including the target device and the host is indirectly connected to a source data storage system including the source device.

3. The method of claim 2, wherein the host issues a command to the target data storage system instructing the target data storage system to obtain the source device descriptor from the source data storage system, and the method further comprising:

returning the source device descriptor to the host.

4. The method of claim 3, wherein the host issues a command to the target data storage system to obtain the target device geometry parameters.

5. The method of claim 4, wherein the host performs said translating.

6. The method of claim 5, wherein the host issues a command to the target data storage system to perform said migrating.

7. The method of claim 6, wherein the target data storage system uses a data pull technique to control copying data from the source device to the target device.

8. The method of claim 2, wherein the host issues a command to the target data storage system instructing the target data storage system to invoke code on the target data storage system to perform said receiving a source device descriptor of the source device, sending the target device geometry parameters to the host, said translating, and said migrating.

9. The method of claim 1, further comprising:

performing one or more data validation checks.

10. The method of claim 9, wherein the one or more data validation checks include determining whether data of the source device fits on said target device.

11. The method of claim 10, further comprising:

comparing a capacity of the source device to a capacity of the target device.

12. The method of claim 10, further comprising:

comparing a first sum of partition sizes of said source device to a second sum of partition sizes of said target device.

13. The method of claim 9, wherein the one or more validation checks includes detecting invalid overlapping partitions.

14. The method of claim 13, wherein a partition which completely contains one or more other partitions is determined to be a valid overlapping partition, and the method includes determining, using the mapped partition definition structure, whether a first of said one or more partitions is a valid overlapping partition when stored on the target device, said determining whether the first partition is a valid overlapping partition including:

determining, using the mapped partition definition structure, whether each of said one or more partitions having a starting location within boundaries of said first partition is also contained completely within the boundaries of the first partition; and determining, using the mapped partition definition structure, whether a starting location boundary and an ending location boundary of said first partition, respectively, match another starting location of a partition contained within the first partition and another ending location of a partition contained within the first partition.

15. The method of claim 9, wherein said generating, said storing and said migrating are not performed if said one or more data validation checks are not successful, wherein said one or more validation checks include determining that each of said one or more partitions migrated from the source device to the target device does not overlap another one of the one or more partitions on the target device as indicated by starting and ending locations for each of said one or more partitions included in the mapped partition definition structure.

16. The method of claim 1, wherein at least one of the source device geometry parameters differs from at least one of the target device geometry parameters.

17. The method of claim 16, wherein the source device geometry parameters and the target device geometry parameters each include a first value indicating a number of blocks/track, a second value indicating a number of tracks/cylinder and a third value indicating a number of cylinders in a logical device, said first, second and third values being determined in accordance with one or more data storage systems including said source device and said target device.

18. A system comprising:

a host;

a source data storage system including a source device;

a target data storage system including a target device, the target data storage system being directly connected to the host and directly connected to the source data storage system, wherein said host only has indirect connectivity to the source data storage system through the target data storage system; and wherein the target data storage system includes code stored on a computer readable storage medium that, when executed, performs steps comprising:

obtaining a source device descriptor of the source device, the source device descriptor including source device geometry parameters and a source partition definition structure;

migrating data for one or more partitions of the source device to the target device using a data pull technique; and wherein the host includes code stored on a computer readable storage medium that, when executed, performs steps comprising:

obtaining target device geometry parameters from the target data storage system;

issuing a command to the target data storage system to obtain the source device descriptor from the source data storage system;

translating the source partition definition structure and generating a mapped partition definition structure in accordance with the target device geometry parameters;

generating a target device descriptor including the target device geometry parameters and the mapped partition definition structure;

issuing a command to the target data storage system to store the target device descriptor on the target device; and issuing a command to the target data storage system to migrate data for one or more partitions of the source device to the target device.

19. A computer readable storage medium comprising code stored thereon for migrating data from a source device to a target device that, when executed, performs steps comprising:

receiving a source device descriptor of the source device, the source device descriptor including source device geometry parameters and a source partition definition structure;

receiving target device geometry parameters;

translating the source partition definition structure and generating a mapped partition definition structure in accordance with the target device geometry parameters;

generating a target device descriptor including the target device geometry parameters and the mapped partition definition structure;

storing the target device descriptor on the target device; and migrating data for one or more partitions of the source device to the target device, wherein a host performs said generating and generates the target device descriptor and the host issues a command to a target data storage system including the target device to perform said storing to store the target device descriptor on the target device.

20. The computer readable storage medium of claim 19, further for performing validation processing, wherein said validation processing includes performing a data validation check ensuring that a first total capacity of the target device is greater than or equal to a second total capacity of the source device, said first total capacity being determined as a mathematical product of the target device geometry parameters and said second total capacity being determined as a mathematical product of the source device geometry parameters.

* * * * *